United States Patent
Maeda et al.

(10) Patent No.: US 12,252,177 B2
(45) Date of Patent: Mar. 18, 2025

(54) VEHICLE SIDE STRUCTURE

(71) Applicant: TOYOTA JIDOSHA KABUSHIKI KAISHA, Aichi-ken (JP)

(72) Inventors: Hirokazu Maeda, Nagoya (JP);
Masahiro Nozawa, Toyota (JP);
Tomohito Sono, Okazaki (JP);
Yoshihiro Kojima, Aichi-ken (JP);
Nobuhito Nishio, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 302 days.

(21) Appl. No.: 17/974,529

(22) Filed: Oct. 27, 2022

(65) Prior Publication Data
US 2023/0174162 A1 Jun. 8, 2023

(30) Foreign Application Priority Data
Oct. 28, 2021 (JP) ................. 2021-176852

(51) Int. Cl.
*B62D 25/04* (2006.01)
*B62D 21/15* (2006.01)
*B60R 25/24* (2013.01)

(52) U.S. Cl.
CPC ........... *B62D 25/04* (2013.01); *B62D 21/157* (2013.01); *B60R 25/241* (2013.01)

(58) Field of Classification Search
CPC .................. B62D 25/04; B62D 21/157
See application file for complete search history.

(56) References Cited

U.S. PATENT DOCUMENTS

| | | |
|---|---|---|
| 2012/0032463 A1 | 2/2012 | Gerndorf et al. |
| 2017/0008568 A1 | 1/2017 | Heitkamp et al. |
| 2017/0101133 A1* | 4/2017 | Emura ................ B62D 21/157 |
| 2018/0244231 A1 | 8/2018 | Tanaka |
| 2019/0111856 A1 | 4/2019 | Ette et al. |
| 2020/0353989 A1 | 11/2020 | Sakai |
| 2021/0284099 A1 | 9/2021 | Uehata et al. |

FOREIGN PATENT DOCUMENTS

| | | |
|---|---|---|
| DE | 10332633 A1 | 3/2005 |
| DE | 102010013700 A1 | 8/2011 |
| DE | 102015106812 A1 | 11/2016 |
| DE | 102015213342 B3 | 11/2016 |

(Continued)

*Primary Examiner* — Daniel J Colilla
(74) *Attorney, Agent, or Firm* — HAUPTMAN HAM, LLP

(57) ABSTRACT

A vehicle side structure includes a side door and a pillar which includes at least a pillar reinforcement. In the vehicle side structure, an end portion, in a vehicle longitudinal direction, of the side door incorporates a digital key sensor and has a protruding region, and the pillar reinforcement includes an outer wall facing outward in the vehicle width direction and having an indented region in which a part of a main surface of the outer wall is curved or bent so as to protrude inward in the vehicle width direction, a center concave bead extending along the vehicle vertical direction at the center, in the vehicle longitudinal direction, of the outer wall, and a center convex bead raised from a bottom surface of the center concave bead, in which a vertical length range of the center convex bead is overlapped at least partially with the indented region.

6 Claims, 7 Drawing Sheets

(56) References Cited

FOREIGN PATENT DOCUMENTS

| | | |
|---|---|---|
| EP | 3473498 A1 | 4/2019 |
| JP | 2011161941 A | 8/2011 |
| JP | 2012116396 A | 6/2012 |
| JP | 2020183188 A | 11/2020 |
| JP | 2021142805 A | 9/2021 |

* cited by examiner

VEHICLE SIDE STRUCTURE

CROSS REFERENCE TO RELATED APPLICATION

This application claims priority to Japanese Patent Application No. 2021-176852 filed on Oct. 28, 2021, which is incorporated herein by reference in its entirety including the specification, claims, drawings, and abstract.

TECHNICAL FIELD

The present disclosure discloses a vehicle side structure including a side door and a pillar opposing a longitudinal end portion of the side door.

BACKGROUND

In general, pillars disposed on a side portion in a vehicle are elongated in a vertical direction and designed to define the edge of a door opening in a vehicle longitudinal direction. Such pillars oppose a longitudinal end portion of a side door in the vehicle width direction, the longitudinal direction of the side door being the vehicle longitudinal direction. As such pillars constitute a part of the skeletal framework of the vehicle, they are required to be of high strength. With this in view, techniques for increasing the strength of pillars have been suggested, including a technique of installing a pillar reinforcement (hereinafter abbreviated as "pillar R/F") within the pillar and arranging a plurality of beads on the pillar R/F (see, for example, Patent Document 1).

CITATION LIST

Patent Literature

Patent Document 1: JP 2011-161941 A

Some vehicles have a digital key function of receiving through wireless communication a signal indicative of whether or not a side door is locked (hereinafter, the signal is referred to as a "locking signal"), and electrically controlling a lock of the side door in response to the received signal. In vehicles having such a digital key function, it is common that a digital key sensor for receiving the locking signal is arranged inside the side door at an end region in the vehicle longitudinal direction of the side door. Further, the side door includes, in the area of the digital key sensor, a protruding region in which a surface of the side door on its inner side in the vehicle width direction protrudes inward in the vehicle width direction.

When the side door has such a protruding region, it is necessary that the pillar be provided with an indented region, which is curved or bent inward in the vehicle width direction when viewed in the vehicle longitudinal direction, in order to avoid interference with the protruding region. However, when a bending moment is applied due to a side collision onto a pillar including an indented region, stress is concentrated onto the indented region. As a result, when an indented region is formed on the pillar, the pillar will buckle under a smaller load than that which would cause buckling of a pillar which includes no indented region. Increasing the plate thickness of the pillar may be considered to prevent buckling, but this will create other problems, such as increased weight or cost of the pillar.

In light of these circumstances, the present disclosure discloses a vehicle side structure in which a pillar of sufficient strength can be secured even when a digital key sensor is installed inside a side door.

SUMMARY

A vehicle side structure disclosed herein includes a side door and a pillar extending in a vehicle vertical direction and is, in a vehicle width direction, opposed to an end portion, in a vehicle longitudinal direction, of the side door, the pillar including at least a pillar reinforcement. In the vehicle side structure, the end portion, in the vehicle longitudinal direction, of the side door incorporates a digital key sensor and has a protruding region in which a surface located on an inner side of the side door in the vehicle width direction protrudes inward in the vehicle width direction, and the pillar reinforcement includes an outer wall facing outward in the vehicle width direction and having an indented region which is formed by curving or bending a part of a main surface of the outer wall so as to protrude inward in the vehicle direction when viewed in the vehicle longitudinal direction for avoiding interference with the protruding region, a center concave bead extending along the vehicle vertical direction at a center, in the vehicle longitudinal direction, of the outer wall and being depressed inward in the vehicle width direction from the main surface, and a center convex bead which is raised from a bottom surface of the center concave bead so as to be at least partially located in a groove of the center concave bead. In the vehicle side structure, the vertical length range of the indented region at least partially overlaps the vertical length range of the center convex bead.

Because the center convex bead is at least partially located in the groove of the center concave bead, the strength of the outer wall can be improved in the vicinity of the center convex bead as compared to a case wherein the center convex bead is provided only on the outer wall. Further, because the indented region at least partially overlaps the center convex bead, buckling of the indented region, and thus buckling of the pillar reinforcement, can be effectively prevented. As a result, sufficient strength of the pillar can be secured even when the digital key sensor is installed inside the side door.

In this case, the center convex bead may be extended to a position below a lower end of the center concave bead.

When configured as described above, the center concave bead and the center convex bead have terminal ends whose positions are displaced from each other. As a result, stress concentration on the terminal ends of the beads can be mitigated, to thereby effectively prevent buckling of the indented region, and thus prevent buckling of the pillar reinforcement. Consequently, a pillar of sufficient strength can be secured even when the digital key sensor is installed inside the side door.

In this case, the center convex bead may be configured to protrude outward in the vehicle width direction beyond the main surface at a position between the lower end of the center concave bead and a lower end of the center convex bead, and in part or all of a range from an upper end of the center convex bead to the lower end of the center concave bead, a degree of protrusion of the main surface from the bottom surface of the center concave bead may be equal to a degree of protrusion of the center convex bead from the bottom surface of the center concave bead, and the center concave bead may function as a groove between the main surface and the center convex bead.

When configured as described above, the main surface is reinforced over a broad range by at least one of the center concave and convex beads. In this way, it can be ensured that stress concentration is reliably mitigated, to thereby effectively prevent buckling of the pillar reinforcement.

Further, the center convex bead may be gradually raised from the bottom surface of the center concave bead in a sloped shape in which the degree of protrusion of the center convex bead is increased toward its lower end, while an upper end of a top surface of the center convex bead may be directly joined to the bottom surface of the center concave bead.

When configured as described above, an abrupt change in strength in the vicinity of the upper end of the center convex bead can be prevented, which can enable to effective prevention of the stress concentration on the vicinity of the upper end of the center convex bead.

Still further, a lower end portion of the bottom surface of the center concave bead may be inclined so as to gradually approach the main surface level toward its lower end, and the lower end of the bottom surface of the center concave bead may be merged into the main surface without any steps being created between the bottom surface and the main surface.

With the above-described configuration, an abrupt change in strength in the vicinity of the lower end of the center concave bead can be avoided, which can further ensure effective prevention of stress concentration.

Moreover, a hinge attachment surface which is substantially flat may be disposed on a portion of the outer surface that is located below the indented region, and the top surface of the center convex bead may be connected at a lower end thereof to the hinge attachment surface with an angle being formed to protrude outward in the vehicle width direction between the top surface and the hinge attachment surface.

When configured as described above, a separate surface to connect the center convex bead and the hinge attachment surface is not required, which can reduce the number of surface interfaces, and thus locations at which stress is likely to concentrate. As such, effectiveness of prevention of buckling of the pillar reinforcement is further enhanced.

According to the vehicle side structure disclosed herein, a pillar of sufficient strength can be secured even when a digital key sensor is installed inside the side door.

BRIEF DESCRIPTION OF DRAWINGS

Embodiments of the present disclosure will be described based on the following figures, wherein.

DESCRIPTION OF EMBODIMENTS

Figure 1:
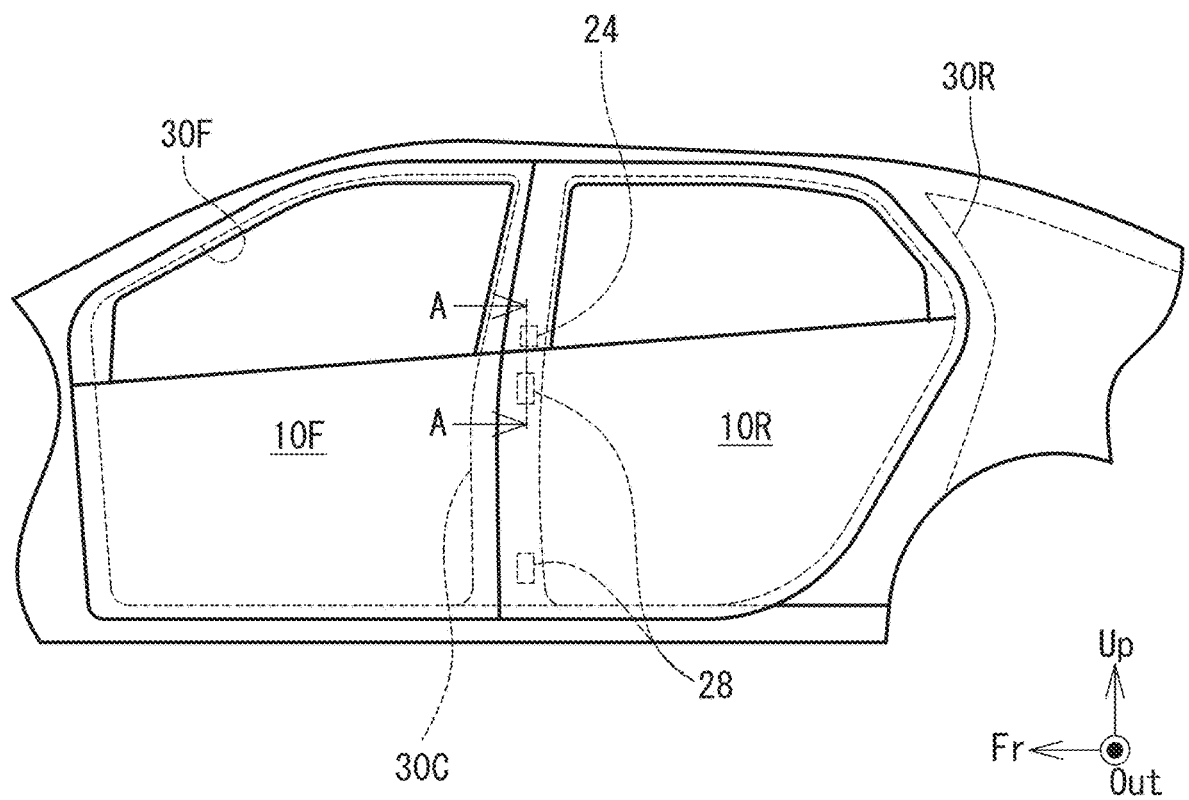
FIG. 1 is a diagram of a vehicle viewed from its side.

Hereinafter, a vehicle side structure will be explained with reference to the drawings. In the drawings, reference letters "Fr", "Up", and "Out" represent a forward direction of a vehicle, an upward direction of the vehicle, and an outward direction in a vehicle width direction, respectively.

As shown in FIG. 1, a side portion of a vehicle includes a front door 10F and a rear door 10R. The front door 10F is a side door designed to be closable for covering a door opening located beside a front seat of the vehicle, while the rear door 10R is another side door designed to be closable for covering a door opening located beside a rear seat of the vehicle. A center pillar 30C is disposed on a border between the door opening beside the front seat and the door opening beside the rear seat. The center pillar 30C is a skeleton member which is elongated in the vehicle vertical direction. A rear end portion of the front door 10F and a front end portion of the rear door 10R are opposed to the center pillar 30C in the vehicle width direction.

The rear door 10R pivots on a hinge 28 disposed in the vicinity of the front end portion of the rear door 10R about a hinge axis extending substantially in parallel with the vertical direction. A digital key sensor 24 is installed in the front end portion of the rear door 10R at a position above the hinge 28. The digital key sensor 24 receives a radio wave signal indicative of a state of a lock of the rear door 10R; i.e., a locking signal. The locking signal may be transmitted from a dedicated remote controller or from a portable information terminal such as, for example, a smartphone. The digital key sensor 24 transmits the received locking signal to a digital key (not illustrated). The digital key is a locking mechanism for electrically locking or unlocking the rear door 10R in response to the locking signal. It should be noted that although the hinge 28 and the digital key sensor 24 provided to the rear door 10R are explained herein, the front door 10F is also equipped with a hinge and a digital key sensor in a similar manner.

Figure 2:
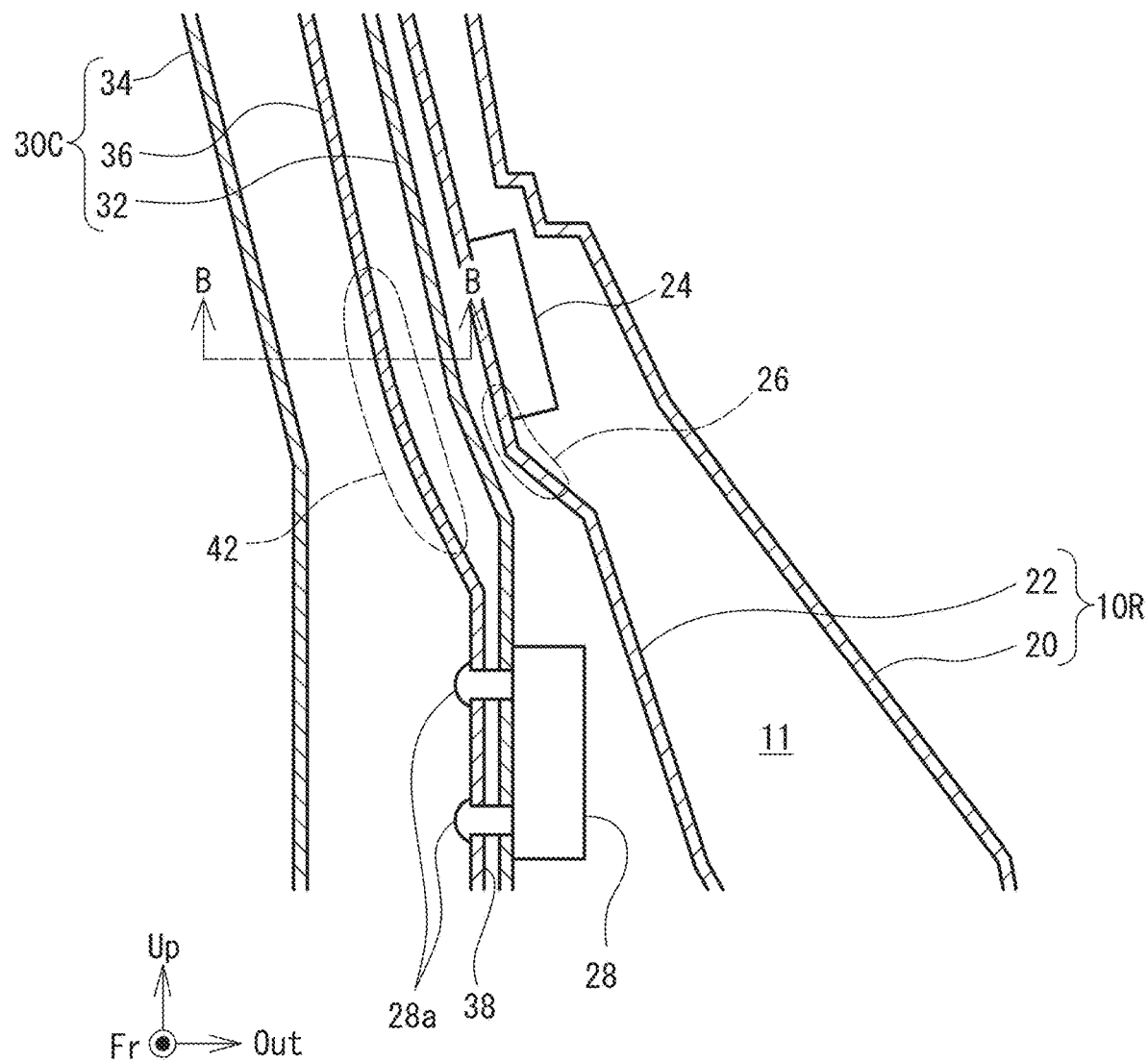
FIG. 2 is a cross sectional view taken along line A-A indicated in FIG. 1.

A portion of the rear door 10R that includes a location of the digital key sensor 24 protrudes inward in the vehicle width direction to account for the thickness of the digital key sensor 24. This is explained below with reference to FIG. 2. FIG. 2 shows a cross section A-A taken along line A-A indicated in FIG. 1.

As shown in FIG. 2, the rear door 10R includes a door outer panel 20 and a door inner panel 22. The door outer panel 20 and the door inner panel 22 are joined to each other at their peripheral edges to define a door inside space 11 between the door outer and inner panels 20 and 22. The digital key sensor 24 is placed in the door inside space 11. The door inner panel 22 protrudes inward in the vehicle width direction at the location of the digital key sensor 24 to avoid the digital key sensor 24 affecting the design of the door outer panel 20. Hereinafter, a region of the door inner panel 22 that protrudes inward is referred to as a protruding region 26. The protruding region 26 is located above the hinge 28 as shown in FIG. 2.

Figure 3:
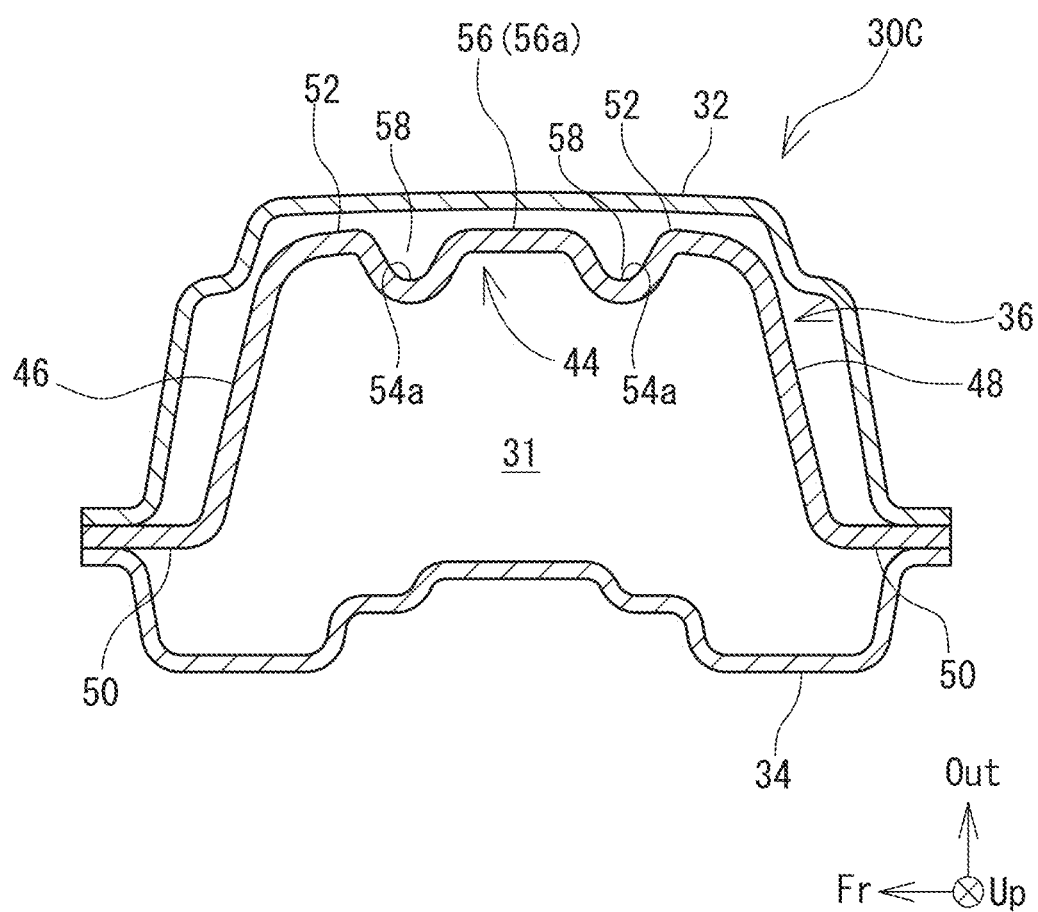
FIG. 3 is a cross sectional view of a center pillar at a third position in FIG. 4 that is taken along line B-B indicated in FIG. 2.

The center pillar 30C has an indented region 42 which is curved or bent into an inwardly protruding shape with respect to the vehicle width direction so as to not interfere with the protruding region 26. The structure of the center pillar 30C is explained with reference to FIG. 3. FIG. 3 shows a cross section B-B of the center pillar 30C taken along line B-B indicated in FIG. 2.

As shown in FIGS. 2 and 3, the center pillar 30C includes a pillar outer panel 32, a pillar inner panel 34, and a pillar R/F 36. As shown in FIG. 3, a cross section of the pillar outer panel 32 has a somewhat "hat shape" that protrudes outward in the vehicle width direction, while the pillar inner panel 34 is disposed on a position shifted inward from the pillar outer panel 32 in the vehicle width direction, and has a "hat shape" cross section that protrudes inward in the vehicle width direction. The pillar inner panel 34 and the pillar outer panel 32 are joined to each other at their ends in the vehicle width direction, to define a closed section 31.

The pillar R/F 36 is a reinforcement member arranged within the closed section 31 in order to reinforce the pillar 30. The pillar R/F 36 has a cross sectional shape which substantially conforms to the pillar outer panel 32; i.e., a substantially "hat shape" in a cross section that protrudes outward in the vehicle width direction. More specifically, the pillar R/F 36 includes an outer wall 44 which faces outward in the vehicle width direction, a front wall 46 and a rear wall 48 both of which extend inward in the vehicle width direction from corresponding ends of the outer wall 44 located at front and rear ends in the vehicle longitudinal direction, and flanges 50 extending from an inner end, in the vehicle width direction, of the front wall 46 toward a front part of the vehicle and extending from an inner end, in the vehicle width direction, of the rear wall 48 toward a rear part of the vehicle.

Two hinge attachment surfaces 38 (see FIG. 2) onto which fastening members 28a of the hinge 28 are fixed are arranged at upper and lower positions spaced from each other on the outer wall 44. It should be noted that FIG. 2 shows only one of the hinge attachment surfaces 38 that is arranged at the upper position, and the expression "hinge attachment surface 38" used in the following description refers to the hinge attachment surface 38 arranged at the upper position. The hinge attachment surface 38 is a flat surface extending substantially in parallel to the vehicle vertical direction. The outer wall 44 is bend inward in the vehicle width direction at a border with an upper end of the hinge attachment surface 38, and extends upward in a slanting direction from the border.

The outer wall 44 has the indented region 42 which is formed, when viewed in the vehicle longitudinal direction, into an inwardly protruding shape with respect to the vehicle width direction by curving a portion of the outer wall 44 that extends upward from the upper end of the hinge attachment surface 38, so as to avoid interference with the protruding region 26 of the rear door 10R. There is a tendency for stress to concentrate at the indented region 42 when a bending moment is applied at a side collision from the outside toward the inside of the vehicle. For this reason, there has been a danger that the pillar R/F 36 having the indented region 42 may buckle due to stress concentration on the indented region 42 before reaching an intrinsic load bearing capacity of the pillar R/F 36.

Figure 4:
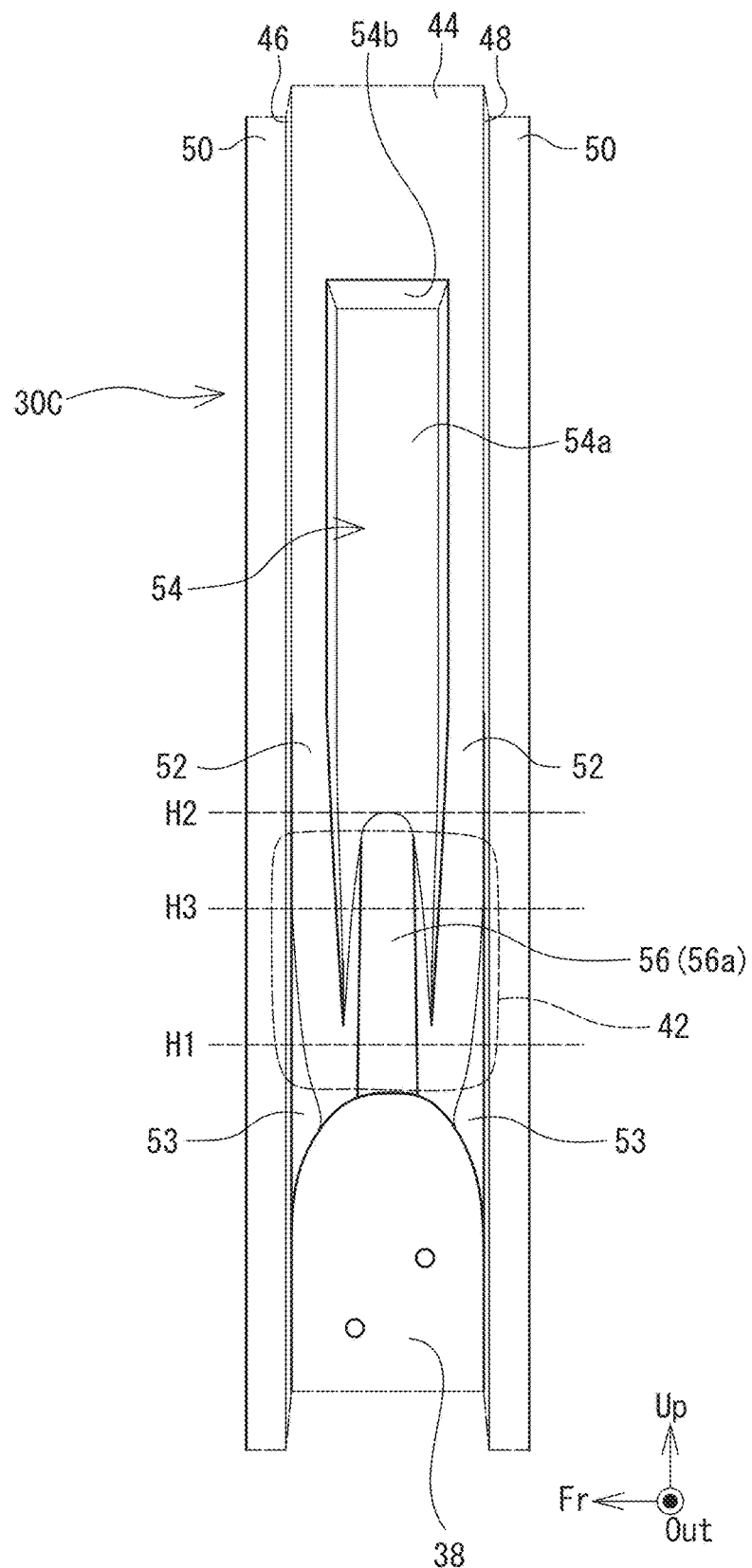
FIG. 4 is a diagram showing a pillar R/F in the vicinity of an indented region viewed from a lateral side of the vehicle.
Figure 5:
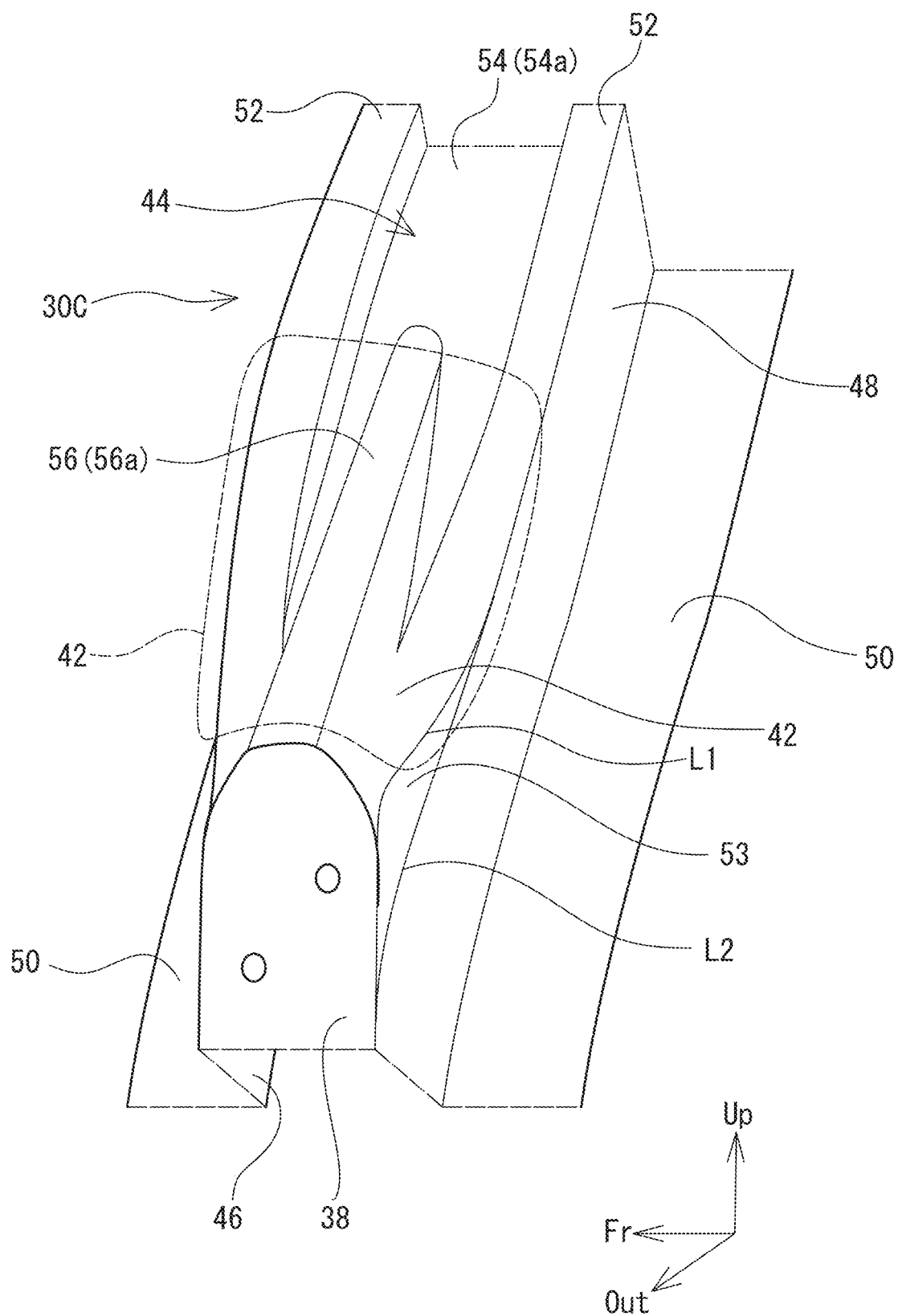
FIG. 5 is a perspective view of the pillar R/F in the vicinity of the indented region.
Figure 6:
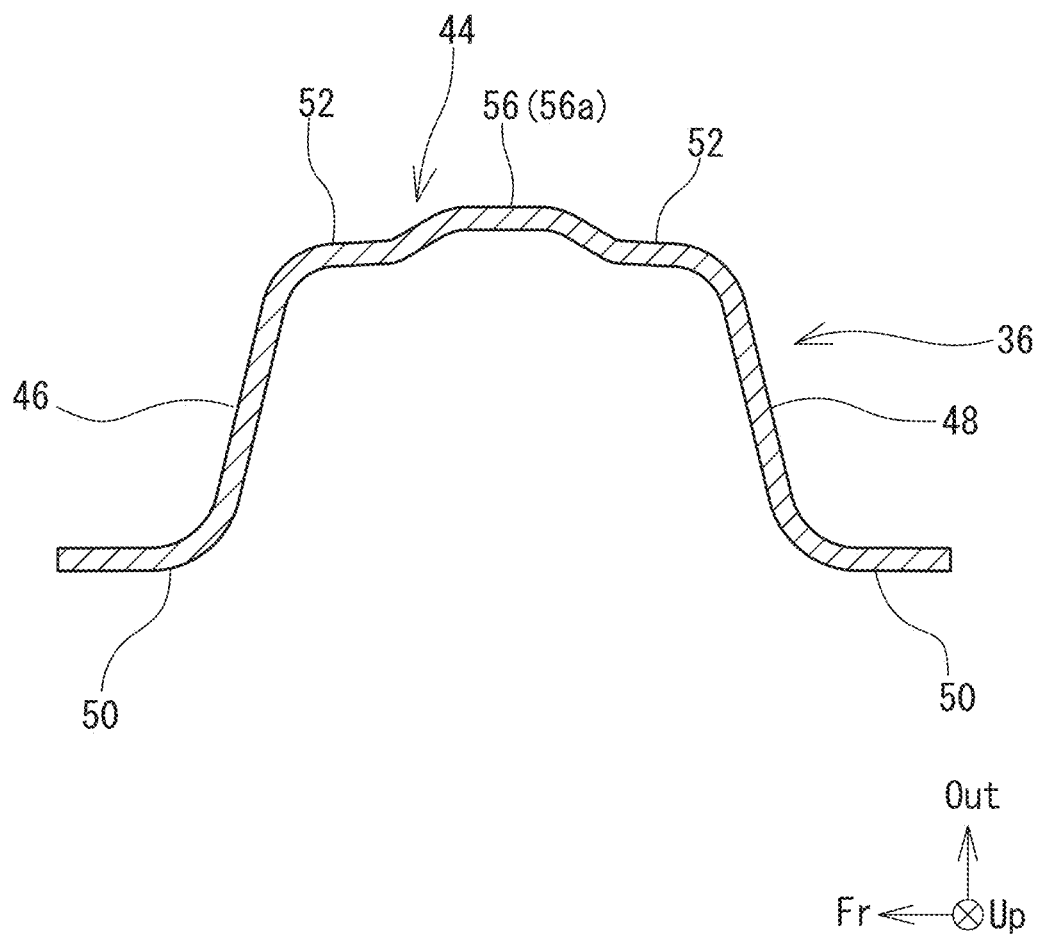
FIG. 6 is a cross sectional view of the pillar R/F at a first position indicated in FIG. 4.
Figure 7:
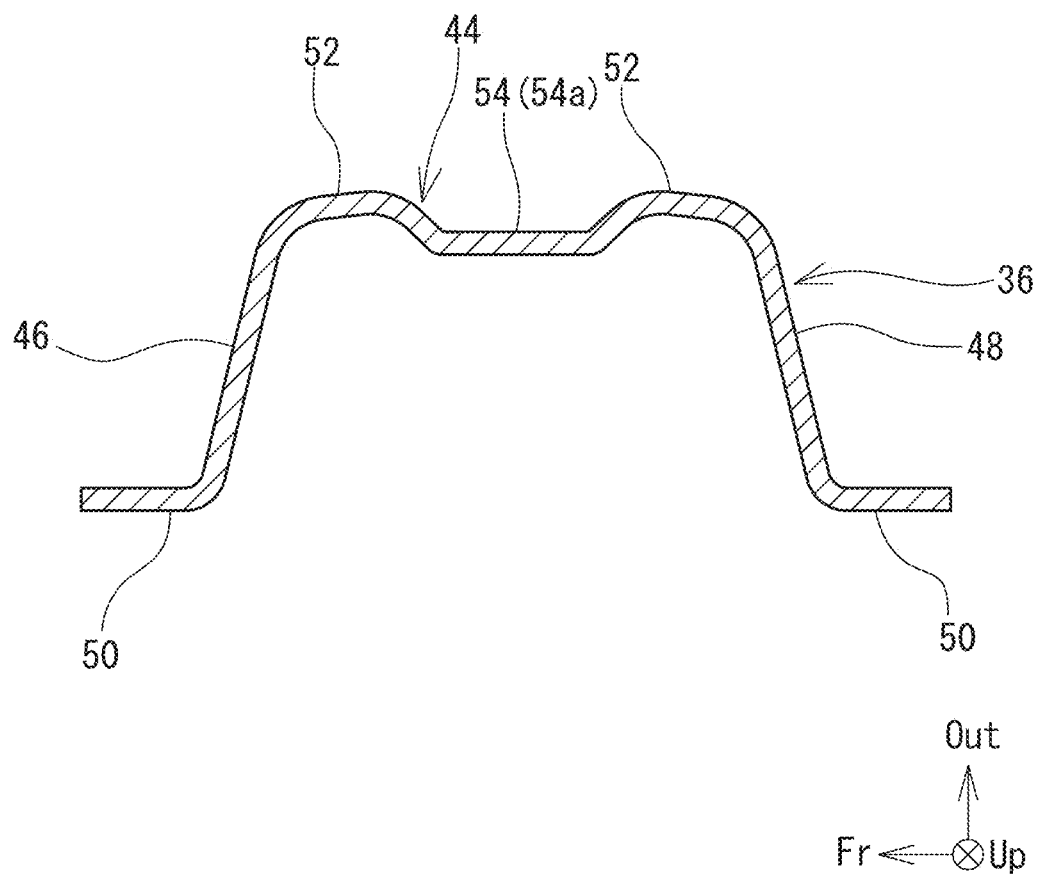
FIG. 7 is a cross sectional view of the pillar R/F at a second position indicated in FIG. 4.

In this example, a plurality of beads are arranged in the vicinity of the indented region 42 and terminal ends of the plurality of beads are displaced from each other in the vehicle vertical direction to prevent concentration of stress on the indented region 42, and thus prevent buckling of the pillar R/F 36. This is explained with reference to FIGS. 3 to 7. FIG. 4 shows the pillar R/F 36 in the vicinity of the indented region 42 viewed from a lateral side of the vehicle, and FIG. 5 is a perspective view of the pillar R/F 36 in the vicinity of the indented region 42. FIG. 6 is a cross sectional view of the pillar R/F 36 at a first position H1 indicated in FIG. 4, and FIG. 7 is a cross sectional view of the pillar R/F 36 at a second position H2 indicated in FIG. 4. It should be noted that a third position H3 indicated in FIG. 4 matches the line B-B indicated in FIG. 2.

As described above and illustrated in FIGS. 4 and 5, the hinge attachment surface 38 for fixing the fastening members 28a of the hinge 28 is disposed on the outer wall 44 of the pillar R/F 36, and the indented region 42 is arranged above the hinge attachment surface 38. The indented region 42 is formed by curving a portion of a main surface 52 of the outer wall 44 into the shape protruded inward in the vehicle width direction when viewed in the vehicle longitudinal direction, to avoid interference with the protruding region 26.

When the main surface 52 is curved inward in the vehicle width direction, ridge lines L1 of the main surface 52 located on both ends, in the vehicle longitudinal direction, of the main surface 52 are also curved inward in the vehicle width direction as shown FIG. 5. On the other hand, in this example, ridge lines L2 of the front wall 46 and the rear wall 48 are not designed to curve inward in the vehicle width direction. In this case, because a gap is created between the ridge line L1 and the ridge line L2, patch surfaces 53 are provided in gaps in which each of the patch surfaces 53 is connected at an angle with the main surface 52 and corresponding one of the front wall 46 and the rear wall 48.

A center concave bead 54 and a center convex bead 56 are formed in a portion of the outer wall 44 that is located above the hinge attachment surface 38; i.e., the portion of the outer wall 44 including the indented region 42. The center concave bead 54 extends along the vehicle vertical direction at the center, in the vehicle longitudinal direction, of the outer wall 44, and is depressed inward in the vehicle width direction from the main surface 52. An upper end portion of a bottom surface 54a of the center concave bead 54 forms a step with the main surface 52, while a lower end portion of the bottom surface 54a of the center concave bead 54 is merged into the main surface 52 rather than forming the step with the main surface 52. In other words, an upper edge of the bottom surface 54a of the center concave bead 54 is separated from the main surface 54 as shown in FIG. 4, and a rising wall 54b (see FIG. 4) is formed between the upper edge of the bottom surface 54a and the main surface 52. On the other hand, a lower portion of the bottom surface 54a is inclined so as to gradually approach a main surface 52 level toward its lower end, and the center concave bead 54 finally disappears when the bottom surface 54 reaches the main surface 52 level.

The center convex bead 56 extends at the center, in the vehicle longitudinal direction, of the outer wall 44 along the vehicle vertical direction and protrudes outward in the vehicle width direction. The center convex bead 56 is raised outward in the vehicle width direction from the bottom surface 54a of the center concave bead 54. In other words, a part of the center convex bead 56 is located within a groove of the center concave bead 54, and an upper end of the center convex bead 56 is located between upper and lower ends of the center concave bead 54. Further, a linear dimension, along the vehicle longitudinal direction, of the center convex bead 56 is smaller than a linear dimension, along the vehicle longitudinal direction, of the center concave 54.

The upper end of the center convex bead 56 is merged into the bottom surface 54a of the center concave bead 54, without forming a step between the upper end and the bottom surface 54a. That is, a top surface 56a of the center convex bead 56 is gradually raised from the bottom surface 54a of the center concave bead 54 so as to have a sloped shape in which the degree of protrusion of the top surface 56a relative to the bottom surface 54a increases toward the lower end of the top surface 54a.

In addition, the center convex bead 56 extends downward to a position below the lower end of the center concave bead 54, and is finally connected to an upper end edge of the hinge attachment surface 38. In other words, the top surface 56a of the center convex bead 56 extends to the upper end edge of the hinge attachment surface 38, and the lower end of the top surface 56a is connected to the hinge attachment surface 38 at an angle protruding outward in the vehicle width direction.

Meanwhile, the main surface 52 has, as described above, the indented region 42 which is curved to protrude inward in the vehicle width direction when viewed in the vehicle longitudinal direction, to avoid interference with the protruding region 26. The center convex bead 56 is placed at a position where a vertical length range of the center convex bead 56 at least partially overlaps a vertical length range of the indented region 42.

The reason for forming the structure as described above is explained below. As described above, the outer wall 44 in this example has the indented region 42 which is curved to protrude inward in the vehicle width direction when viewed in the vehicle longitudinal direction. Because stress tends to concentrate on the indented region 42, the indented region 42 is vulnerable to buckling. Forming a bead may be considered as a measure for preventing buckling. However, when only one bead is formed, an end position of the one bead will become a vulnerable region. For example, when only the center concave bead 54 is provided without forming the center convex bead 56, the region close to the lower end of the center concave bead 54 will be a vulnerable region in which strength abruptly changes, which can result in easy occurrence of buckling. On the other hand, when only the center convex bead 56 is provided without forming the center concave bead 54, the region close to the upper end of the center convex bead 56 will be a vulnerable region in which strength abruptly changes, which also can result in easy occurrence of buckling.

On the other hand, in this example, both the center concave bead 54 and the center convex bead 56 are provided with their terminal ends displaced from each other as described above. In this way, because the formation of vulnerable region is effectively prevented, and the entire range of the indented region 42 is reinforced by at least one of the center concave bead 54 or center convex bead 56, buckling can be prevented effectively. Specifically, at the first position H1 (see FIG. 4) located below the lower end of the center concave bead 54, the center convex bead 56 is protruded outward in the vehicle width direction from the main surface 52 as shown in FIG. 6, to reinforce the main surface 52. This can ensure that stress concentration and thus buckling are effectively prevented from occurring at the first position H1.

Further, at the second position H2 (see FIG. 4) located above the upper end of the center convex bead 56, the center concave bead 54 is depressed from the main surface 52 as shown in FIG. 7. With this configuration, portions of the main surface 52 located on both sides of the center concave bead 54 in the vehicle longitudinal direction function as protruding streaks which are protruded from the bottom surface 54a of the center concave bead 54. In addition, a section modulus of the outer wall 44 is increased by providing the center concave bead 54. Consequently, the presence of the center concave bead 54 can increase the strength of the outer wall 44. In this way, the stress concentration, and thus buckling, can also be effectively prevented at the second position H2.

Still further, at the third position H3 (see FIG. 4) located above the lower end of the center concave bead 54 and below the upper end of the center convex bead 56, the degree of protrusion of the main surface 52 protruding from the bottom surface 54a becomes equal to the degree of protrusion of the center convex bead 56 protruding from the bottom surface 54a as shown in FIG. 3. In other words, the main surface 52 is substantially flush with the top surface 56a of the center convex bead 56 at the third position H3. Still, even in this case, the center concave bead 54 functions as grooves 58 between the main surface 52 and the center convex bead 56 to reinforce the main surface 52. Therefore, even at the third position H3, the stress concentration, and thus buckling, can be effectively prevented.

Moreover, in this example, the lower end of the bottom surface 54a of the center concave bead 54 is merged into the main surface 52 rather than forming a step between the bottom surface 54a and the main surface 52. Because no step is formed, the change in strength in the vicinity of the lower end of the center concave bead 54 is mitigated, which can ensure that concentration of stress is effectively prevented. As a result, buckling of the pillar R/F 36 can be prevented more effectively.

Similarly, the upper end of the top surface 56a of the center convex bead 56 is merged into the bottom surface 54a without forming a step between the top surface 56a and the bottom surface 54a. In this way, any change in strength in the vicinity of the upper end of the center convex bead 56 can be mitigated, and concentration of stress concentration can be effectively prevented accordingly. Further, because the lower end of the top surface 56a of the center convex bead 56 is directly connected to the upper end edge of the hinge attachment surface 38, the number of surface interfaces can be reduced compared to a configuration wherein the lower end of the top surface 56a is separated from the upper end edge of the hinge attachment surface 38, which in turn can also contribute to more effective prevention of stress concentration. As a result, buckling of the pillar R/F 36 can be further effectively prevented.

As is evident from the above-description, stress concentration is mitigated, and buckling is accordingly prevented by modifying the shape of the pillar R/F 36, rather than changing a plate thickness or a material of the pillar R/F 36. For this reason, even when the digital key sensor 24 is installed, sufficient strength of the center pillar 30C can be secured while avoiding increases in weight or manufacturing cost of the pillar R/F 36.

It should be noted that the above-described structure is presented by way of illustration, and may be changed appropriately as long as the structure includes the indented region 42 which is created when the digital key sensor 24 is installed, the center convex bead 56 which is disposed so as to be at least partially overlapped with the indented region 42, and the center concave bead 54 which is at least partially overlapped with the center convex bead 56. For example, the center convex bead 56 may have a shape which is entirely containable within the center concave bead 54. In addition, the lower end of the center concave bead 54 is smoothly merged into the main surface 52 without creating any steps in the above-described example, although a step may be created between the lower end of the center concave bead 54 and the main surface 52. Similarly, a step may be formed between the upper end of the center convex bead 56 and the bottom surface 54a of the center concave bead 54. Further, the lower end of the center convex bead 56, which is directly connected to the upper end of the hinge attachment surface 38, may be separated from the upper end of the hinge attachment surface 38.

The structure has been explained in connection with the center pillar 30C taken as an example, the technique disclosed herein may be applied to other pillars, such as, for example, the front pillar 30F and the rear pillar 30R. In a case where the digital key sensor 24 is installed in a forward end portion of the front door 10F, for example, the indented region 42, the center concave bead 54, and the center convex bead 56 may be provided to the front pillar 30F in a manner similar to the above-described example. In another case where the digital key sensor 24 is installed in a rear end portion of the rear door 10R, the indented region 42, the center concave bead 54, and the center convex bead 56 may be provided to the rear pillar 30R. Further, the outer wall 44, which is curved inward in the vehicle width direction in the above description, may be bent inward rather than being curved.

The invention claimed is:

1. A vehicle side structure, comprising:
a side door; and
a pillar which is elongated in a vehicle vertical direction and is, in a vehicle width direction, opposed to an end portion, in a vehicle longitudinal direction, of the side door, the pillar comprising at least a pillar reinforcement;
wherein the end portion, in the vehicle longitudinal direction, of the side door incorporates a digital key sensor and has a protruding region in which a surface located on an inner side of the side door in the vehicle width direction is swollen inward in the vehicle width direction,
wherein the pillar reinforcement comprises;
an outer wall facing outward in the vehicle width direction and having an indented region which is formed by curving or bending a part of a main surface of the outer wall so as to be protruded inward in the vehicle width direction when viewed in the vehicle longitudinal direction, for avoiding interference with the protruding region,
a center concave bead extending along the vehicle vertical direction at a center, in the vehicle longitudinal direction, of the outer wall, the center concave bead being depressed inward in the vehicle width direction from the main surface, and
a center convex bead which is raised from a bottom surface of the center concave bead so as to be at least partially located in a groove of the center concave bead; and
wherein a vertical length range of the center convex bead is at least partially overlapped with a vertical length range of the indented region, wherein
the center convex bead extends to a position located below a lower end of the center concave bead,
the center convex bead is protruded outward in the vehicle width direction beyond the main surface at a position between the lower end of the center concave bead and a lower end of the center convex bead, and
in part or all of a range from the upper end of the center convex bead to the lower end of the center concave bead, a protruding degree of the main surface protruded from the bottom surface of the center concave bead is equal to a protruding degree of the center convex bead protruded from the bottom surface of the center concave bead, while the center concave bead functions as a groove between the main surface and the center convex bead.

2. The vehicle side structure according to claim 1, wherein:
a lower portion of the bottom surface of the center concave bead is inclined so as to gradually approach a main surface level toward a lower end of the bottom surface; and
the lower end of the bottom surface of the center concave bead is merged into the main surface without creating a step between the bottom surface and the main surface.

3. The vehicle side structure according to claim 1, wherein:
a hinge attachment surface which is substantially flat is disposed below the indented region on the outer wall; and
a lower end of a top surface of the center convex bead is connected to the hinge attachment surface with an angle being formed between the hinge attachment surface and the top surface, the angle protruding outward in the vehicle width direction.

4. A vehicle side structure, comprising:
a side door; and
a pillar which is elongated in a vehicle vertical direction and is, in a vehicle width direction, opposed to an end portion, in a vehicle longitudinal direction, of the side door, the pillar comprising at least a pillar reinforcement;
wherein the end portion, in the vehicle longitudinal direction, of the side door incorporates a digital key sensor and has a protruding region in which a surface located on an inner side of the side door in the vehicle width direction is swollen inward in the vehicle width direction,
wherein the pillar reinforcement comprises;
an outer wall facing outward in the vehicle width direction and having an indented region which is formed by curving or bending a part of a main surface of the outer wall so as to be protruded inward in the vehicle width direction when viewed in the vehicle longitudinal direction, for avoiding interference with the protruding region,
a center concave bead extending along the vehicle vertical direction at a center, in the vehicle longitudinal direction, of the outer wall, the center concave bead being depressed inward in the vehicle width direction from the main surface, and
a center convex bead which is raised from a bottom surface of the center concave bead so as to be at least partially located in a groove of the center concave bead; and
wherein a vertical length range of the center convex bead is at least partially overlapped with a vertical length range of the indented region, wherein the center convex bead is gradually raised from the bottom surface of the center concave bead in a sloped shape in which a degree of protrusion of the center convex bead increases toward a lower end of the center convex bead, while an upper end of a top surface of the center convex bead is directly joined to the bottom surface of the center concave bead.

5. The vehicle side structure according to claim 4, wherein:
a lower portion of the bottom surface of the center concave bead is inclined so as to gradually approach a main surface level toward a lower end of the bottom surface; and
the lower end of the bottom surface of the center concave bead is merged into the main surface without creating a step between the bottom surface and the main surface.

6. The vehicle side structure according to claim 4, wherein:
a hinge attachment surface which is substantially flat is disposed below the indented region on the outer wall; and a lower end of a top surface of the center convex bead is connected to the hinge attachment surface with an angle being formed between the hinge attachment surface and the top surface, the angle protruding outward in the vehicle width direction.

\* \* \* \* \*